Patented Aug. 18, 1953

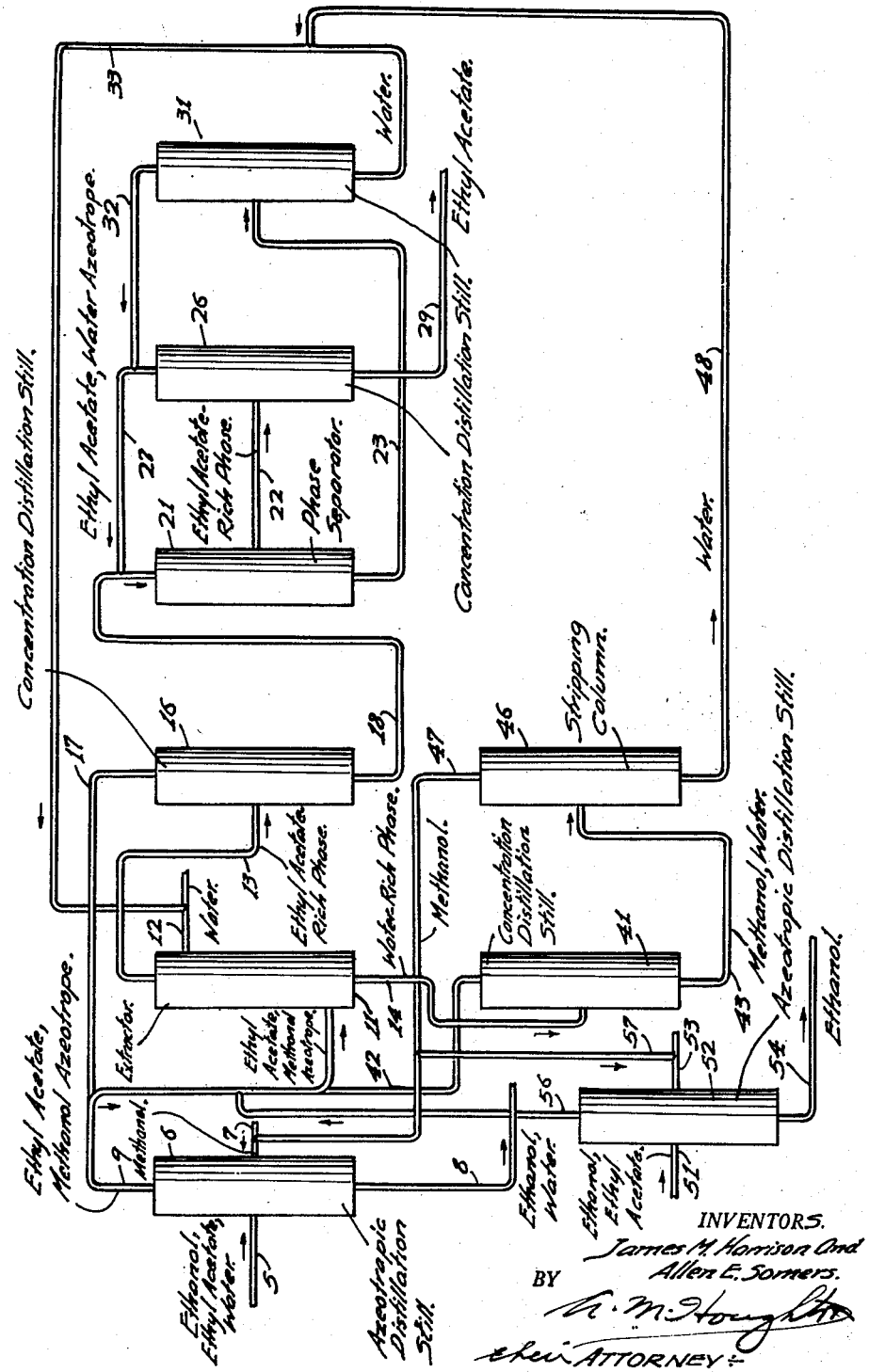

2,649,407

UNITED STATES PATENT OFFICE 2,649,407

SEPARATION OF ETHYL ACETATE AND ETHANOL BY AZEOTROPIC DISTILLATION WITH METHANOL

James M. Harrison, Oakmont, and Allen E. Somers, Pittsburgh, Pa., assignors to Gulf Research & Development Company, Pittsburgh, Pa., a corporation of Delaware Application March 14, 1952, Serial No. 276,615

5 Claims. (Cl. 202—42)

This invention relates to a process for separating mixtures of organic compounds in aqueous solution and more particularly to a process for separating a mixture of ethanol, ethyl acetate, and water.

A mixture of ethanol, ethyl acetate, and water is produced during the separation of Fischer-Tropsch oxygenated products into components. A mixture of ethanol, ethyl acetate, and water is difficult to separate by distillation because the compounds boil within a narrow range and because of the existence of binary and ternary azeotropes of these compounds.

We have found that a mixture of ethanol, ethyl acetate, and water can be efficiently separated by a process which comprises introducing methanol and the mixture into an azeotropic distillation zone, removing as bottoms a mixture of ethanol and water, and as overhead an azeotropic mixture of about 56 per cent ethyl acetate and 44 per cent methanol, the mixture having a boiling point of 62.3° C. at 760 mm. of Hg.

The process further comprises introducing the azeotropic mixture of ethyl acetate and methanol into a water extraction zone, and removing an ethyl acetate-rich phase mixture of ethyl acetate, water, and methanol, and a water-rich mixture of the same compounds from this zone. Water is preferably introduced into the upper portion of the extraction zone, the ethyl acetate-rich phase being removed from the top of the water extraction zone.

The ethyl acetate-rich mixture from the extraction zone is introduced into a concentration distillation zone. An azeotropic mixture of about 56 per cent ethyl acetate and about 44 per cent methanol and having a boiling point of 62.3° C. at 760 mm. of Hg is removed as overhead from the concentration distillation zone and is preferably recycled to the water extraction zone.

A mixture of ethyl acetate and water is removed from the bottom of the concentration distillation zone and is then introduced into a phase separation zone. An ethyl acetate-rich mixture and a water-rich mixture are removed from the phase separation zone, the ethyl acetate-rich mixture usually being removed from the upper portion of the phase separation zone.

The ethyl acetate-rich mixture is introduced into a concentration distillation zone, ethyl acetate is removed as bottoms and discharged as product, and an azeotropic mixture containing about 92 per cent ethyl acetate and about 8 per cent water and having a boiling point of 70.4° C. at 760 mm. of Hg is removed overhead. The azeotropic mixture of ethyl acetate and water is then preferably recycled to the phase separation zone. The water-rich mixture of water and ethyl acetate removed from the phase separation zone is passed to a concentration distillation zone from which water is removed as bottoms and an azeotropic mixture of ethyl acetate and water having a boiling point of 70.4° C. at 760 mm. of Hg is removed as overhead and is preferably recycled to the phase separation zone.

The water-rich mixture of water, methanol, and ethyl acetate removed from the water extration zone to which the azeotrope of ethyl acetate and methanol is introduced, is passed to a concentration distillation zone. An azeotropic mixture of ethyl acetate and methanol having a boiling point of 62.3° C. at 760 mm. of Hg is removed as overhead and a mixture of methanol and water is removed as bottoms from the concentration distillation zone. The azeotropic mixture of ethyl acetate and methanol is passed to a water extraction zone from which an ethyl acetate-rich and a water-rich mixture of ethyl acetate, methanol, and water is removed. This separation can be accomplished in the same water extraction zone as the one employed for separating the azeotropic mixture of ethyl acetate and methanol removed from the azeotropic distillation zone to which the original mixture of ethanol, ethyl acetate and water is introduced. The mixture of methanol and water is removed as bottoms from the concentration distillation zone and can be discharged as such or it can be separated in a stripping zone. When it is separated the water is preferably recycled to the water extraction zone and the methanol is preferably recycled to the azeotropic distillation zone.

The process of our invention can best be understood by reference to the accompanying drawing, the single figure of which presents a simplified flow sheet of an apparatus suitable for carrying out an embodiment of our invention.

Referring to the figure, a mixture of 40 parts ethanol, 242 parts ethyl acetate, and 42 parts water is introduced by line 5 to azeotropic distillation still 6. A mixture of 40 parts ethanol and 42 parts water is removed as bottoms from azeotropic distillation still 6 by line 8 and is discharged from the system. 190 parts of methanol are introduced to the azeotropic distillation still by line 7. An azeotropic mixture containing 242 parts of ethyl acetate and 190 parts of methanol and having a boiling point of 62.3° C. is removed as overhead from azeotropic distillation still 6 by line 9.

An azeotropic mixture of 29 parts ethyl acetate and 23 parts methanol recycled by line 17 and an azeotropic mixture of 289 parts ethyl acetate and 227 parts methanol recycled by line 42 in a manner which will be described, are also introduced into line 9, and the resulting mixture of 560 parts of ethyl acetate and 440 parts methanol is introduced into extractor 11. 2125 parts of water are introduced by line 12 to extractor 11. An ethyl acetate-rich mixture containing 271 parts ethyl acetate, 21 parts water and 23 parts methanol is removed by line 13 and a water-rich mixture containing 2104 parts water, 417 parts methanol and 289 parts ethyl acetate is removed by line 14 from extractor 11.

The ethyl acetate-rich mixture from extractor 11 is introduced by line 13 into concentration distillation still 16. An azeotropic mixture containing 29 parts ethyl acetate and 23 parts methanol and having a boiling point of 62.3° C. at 760 mm. of Hg is recycled by lines 17 and 9 to extractor 11. A mixture of 242 parts ethyl acetate and 21 parts water is removed as bottoms from concentration still 16 by line 18. 136 parts ethyl acetate and 12 parts water recycled as described below are introduced into line 18. An azeotropic mixture of 134 parts ethyl acetate and 12 parts water is recycled from concentration distillation still 26 by line 27 and an azeotropic mixture of 2 parts ethyl acetate and a fractional part of water is recycled from concentration distillation still 31 by lines 32 and 27 in a manner which will be described. The mixtures are introduced into line 18 and the resulting mixture of 378 parts ethyl acetate and 33 parts water is introduced into phase separator 21.

An ethyl acetate-rich phase containing 376 parts ethyl acetate and 12 parts water is removed by line 22, and a water-rich phase containing 21 parts water and 2 parts ethyl acetate is removed by line 23. The ethyl acetate-rich phase mixture is passed by line 22 into concentration distillation still 26. An azeotropic mixture containing 134 parts ethyl acetate and 12 parts water is removed overhead from concentration distillation still 26 and is passed by lines 27 and 18 into phase separator 21. 242 parts of ethyl acetate are removed as bottoms from concentration distillation still 26 by line 29 and are discharged as product. The water-rich phase is introduced into concentration distillation still 31 by line 23. An azeotropic mixture comprising 2 parts ethyl acetate and a fractional part of water is removed overhead from concentration distillation still 31 and is passed by lines 32, 27 and 18 into the phase separator. 21 parts of water are removed as bottoms from concentration still 31. The 21 parts of water together with 2104 parts of water recycled as described below by line 48 are recycled by line 33 and line 12 to extractor 11.

The water-rich mixture of water, methanol and ethyl acetate from extractor 11 is passed by line 14 into concentration distillation still 41. An azeotropic mixture containing 289 parts ethyl acetate and 227 parts methanol and having a boiling point of 62.3° C. at 760 mm. of Hg is removed as overhead from concentration distillation still 41 by line 42 and is introduced by line 9 into extractor 11. A mixture of 190 parts methanol and 2104 parts water is removed as bottoms from concentration distillation still 41 by line 43 and is passed to stripping column 46. 190 parts of methanol are removed overhead by line 47 and are recycled by line 7 into azeotropic distillation still 6. 2104 parts of water are removed as bottoms from stripping column 46 and recycled by lines 48, 33 and 12 into extractor 11.

Some mixtures of ethyl acetate and ethanol obtained in commercial operation do not contain water in admixture with these materials. When it is desired to treat only such a non-aqueous mixture, azeotropic distillation still 6 need not be used and the mixture of ethanol and ethyl acetate is introduced into the system through line 51 to azeotropic distillation still 52. Methanol is also introduced into this still by line 53. Ethanol is removed as bottoms from azeotropic distillation still 52 by line 54. An azeotropic mixture of ethyl acetate and methanol having a boiling point of 62.3° C. at 760 mm. of Hg is removed overhead by line 56 and is passed by this line into line 9 and from this line into extractor 11. The azeotropic mixture is then separated in the manner previously described.

An embodiment of the process of our invention in which a mixture of ethyl acetate, ethanol and water and a mixture of ethyl acetate and ethanol are separated at the same time will now be described. A mixture of 120 parts ethyl acetate, 460 parts ethanol, and 76 parts water is introduced by line 5 into azeotropic distillation still 6. 94 parts methanol are introduced into azeotropic distillation still 6 by line 7. A mixture of 460 parts ethanol and 76 parts water is removed as bottoms by line 8. An azeotropic mixture containing 120 parts ethyl acetate and 94 parts methanol and having a boiling point of 62.3° C. at 760 mm. of Hg is removed overhead by line 9. 118 parts of methanol and a mixture containing 150 parts ethyl acetate and 520 parts ethanol are introduced by line 51 into azeotropic distillation still 52. 520 parts ethanol are discharged as bottoms by line 54. A mixture containing 150 parts ethyl acetate and 118 parts methanol and having a boiling point of 62.3° C. at 760 mm. of Hg is passed by line 56 into line 9. The resulting mixture of 270 parts ethyl acetate and 212 parts methanol is introduced into extractor 11. The mixture of ethyl acetate and methanol is separated in the manner previously described. 270 parts ethyl acetate are removed as products. 118 parts methanol are recycled by line 47 to azeotropic distillation still 6 and 94 parts methanol are passed by line 47 and line 57 and then by line 53 to azeotropic distillation still 52.

Obviously many modifications and variations of the invention as hereinbefore set forth may be made without departing from the spirit and scope thereof, and therefore, only such limitations should be imposed as are indicated in the appended claims.

We claim:

1. A process which comprises introducing methanol and a mixture of ethanol, ethyl acetate and water into an azeotropic distillation zone, removing an azeotropic mixture of ethyl acetate and methanol as overhead from the azeotropic distillation zone, introducing the azeotropic mixture of ethyl acetate and methanol to a water extraction zone, removing an ethyl acetate-rich and a water-rich mixture of ethyl acetate, methanol, and water from said water extraction zone, introducing said ethyl acetate-rich mixture to a concentration distillation zone, removing an azeotropic mixture of ethyl acetate and methanol as overhead and a mixture of ethyl acetate and water as bottoms from said concentration distillation zone, introducing said bottoms mixture of ethyl acetate and water to a phase separation zone, removing an ethyl acetate-rich and a water-rich mixture from said phase separation zone, and removing ethyl acetate as bottoms from said ethyl acetate-rich mixture of ethyl acetate and water in a distillation zone.

2. A process which comprises introducing methanol and a mixture of ethanol, ethyl acetate and water into an azeotropic distillation zone, removing an azeotropic mixture of ethyl acetate and methanol as overhead from the azeotropic distillation zone, introducing the azeotropic mixture of ethyl acetate and methanol to a water extraction zone, removing an ethyl acetate-rich and a water-rich mixture of ethyl acetate, methanol, and water from said water extraction zone, introducing said ethyl acetate-rich mixture to a concentration zone, removing an azeotropic mixture of ethyl acetate and methanol as overhead and a mixture of ethyl acetate and water as bottoms from said concentration distillation zone, introducing the mixture of ethyl acetate and water to a phase separation zone, removing an ethyl acetate-rich mixture and a water-rich mixture from said phase separation zone, introducing said ethyl acetate-rich mixture of ethyl acetate and water to a concentration distillation zone, removing ethyl acetate as bottoms and discharging it as product, removing an azeotropic mixture of ethyl acetate and water as overhead from said concentration distillation zone, and recycling said azeotropic mixture of ethyl acetate and water to said phase separation zone.

3. A process which comprises introducing methanol and a mixture of ethanol, ethyl acetate and water into an azeotropic distillation zone, removing an azeotropic mixture of ethyl acetate and methanol having a boiling point of 62.3° C. at 760 mm. of Hg as overhead from the azeotropic distillation zone, introducing the azeotropic mixture of ethyl acetate and methanol to a water extraction zone, removing an ethyl acetate-rich and a water-rich mixture of ethyl acetate, methanol, and water from said water extraction zone, introducing said ethyl acetate-rich mixture to a concentration zone, removing an azeotropic mixture of ethyl acetate and methanol having a boiling point of 62.3° C. at 760 mm. of Hg as overhead and a mixture of ethyl acetate and water as bottoms from said concentration distillation zone, introducing the mixture of ethyl acetate and water to a phase separation zone, removing an ethyl acetate-rich mixture and a water-rich mixture from said phase separation zone, introducing said ethyl acetate-rich mixture to a concentration distillation zone, removing ethyl acetate as bottoms and discharging it as product, removing an azeotropic mixture of ethyl acetate and water having a boiling point of 70.4° C. at 760 mm. of Hg as overhead from said concentration zone, recycling said azeotropic mixture of ethyl acetate and water to said phase separation zone, passing the water-rich mixture of water and ethyl acetate from the phase separation zone to a concentration zone, discharging water as bottoms and an azeotropic mixture of ethyl acetate and water having a boiling point of 70.4° C. at 760 mm. of Hg as overhead from said concentration zone and recycling said azeotropic mixture to said phase separation zone.

4. A process which comprises introducing methanol and a mixture of ethanol, ethyl acetate and water into an azeotropic distillation zone, removing an azeotropic mixture of ethyl acetate and methanol having a boiling point of 62.3° C. at 760 mm. of Hg as overhead from the azeotropic distillation zone, introducing the azeotropic mixture of ethyl acetate and methanol to a water extraction zone, removing an ethyl acetate-rich and a water-rich mixture of ethyl acetate, methanol, and water from said water extraction zone, introducing said ethyl acetate-rich mixture to a concentration zone, removing an azeotropic mixture of ethyl acetate and methanol as overhead and a mixture of ethyl acetate and water as bottoms from said concentration distillation zone, introducing the mixture of ethyl acetate and water to a phase separation zone, removing an ethyl acetate-rich mixture and a water-rich mixture from said phase separation zone, introducing said ethyl acetate-rich mixture of ethyl acetate and water to a concentration distillation zone, removing ethyl acetate as bottoms and discharging it as product, removing an azeotropic mixture of ethyl acetate and methanol having a boiling point of 70.4° C. as overhead from said concentration zone, recycling said azeotropic mixture of ethyl acetate and water to said phase separation zone, passing the water-rich mixture of water, ethyl acetate and methanol from the water extraction zone to a concentration distillation zone, removing an azeotropic mixture of ethyl acetate and methanol having a boiling point of 62.3° C. at 760 mm. of Hg as overhead and a mixture of methanol and water as bottoms from said concentration zone, recycling the azeotropic mixture of ethyl acetate and water to the extraction zone, separating said mixture of methanol and water, and recycling the methanol to the azeotropic distillation zone.

5. A process which comprises introducing methanol and a mixture of ethanol and ethyl acetate into an azeotropic distillation zone, removing ethanol as bottoms and an azeotropic mixture of ethyl acetate and methanol having a boiling point of 62.3° C. at 760 mm. of Hg as overhead from the azeotropic distillation zone, introducing the azeotropic mixture of ethyl acetate and methanol to a water separation zone, removing an ethyl acetate-rich and a water-rich mixture of ethyl acetate, methanol and water from said water extraction zone, introducing said ethyl acetate-rich mixture to a concentration zone, removing an azeotropic mixture of ethyl acetate and methanol having a boiling point of 62.3° C. at 760 mm. of Hg as overhead, and a mixture of ethyl acetate and water as bottoms from said concentration distillation zone, introducing said bottoms mixture of ethyl acetate and water to a phase separation zone, removing an ethyl acetate-rich and a water-rich mixture from said phase separation zone and removing ethyl acetate as bottoms from said ethyl acetate-rich mixture of ethyl acetate and water.

JAMES M. HARRISON.
ALLEN E. SOMERS.

References Cited in the file of this patent

UNITED STATES PATENTS

| Number | Name | Date |
|---|---|---|
| 2,099,475 | Giesen et al. | Nov. 16, 1937 |
| 2,382,044 | Fisher | Aug. 14, 1945 |
| 2,583,620 | Wrightson | Jan. 29, 1952 |
| 2,607,719 | Eliot et al. | Aug. 19, 1952 |